Figure 1:
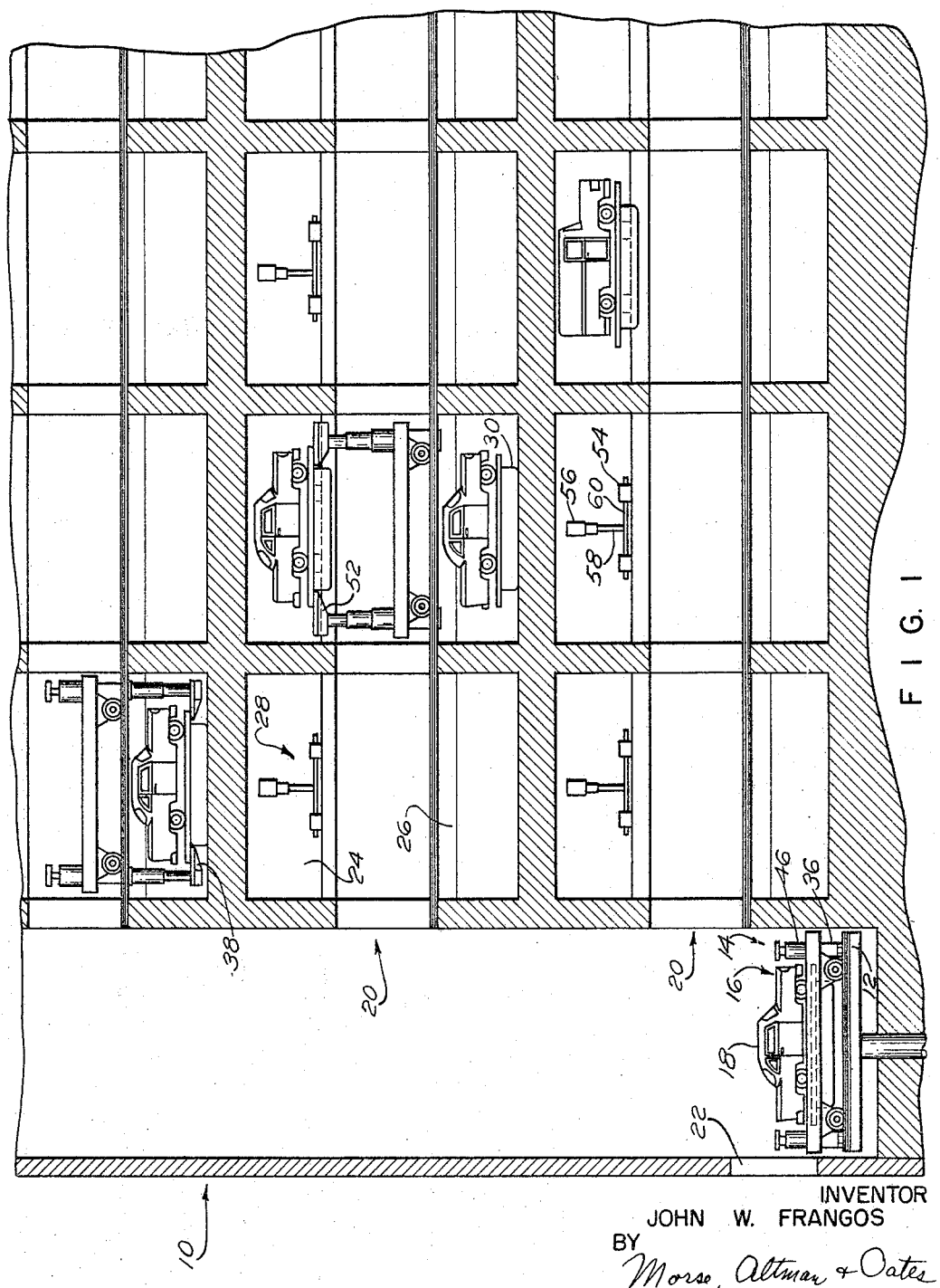

Dec. 27, 1966  J. W. FRANGOS  3,294,260
STORAGE SYSTEM

Filed Sept. 11, 1964  6 Sheets-Sheet 2

INVENTOR
JOHN W. FRANGOS
BY
*Morse, Altman & Oates*
ATTORNEYS

INVENTOR.
JOHN W. FRANGOS

United States Patent Office 3,294,260
Patented Dec. 27, 1966

3,294,260
STORAGE SYSTEM
John W. Frangos, 2 Brimbal Hill Drive,
Beverly, Mass. 01915
Filed Sept. 11, 1964, Ser. No. 395,769
5 Claims. (Cl. 214—16.1)

This invention relates generally to storage systems and more particularly is directed towards a new and improved storage system which optimizes the storage capacity of a given volume and includes associated apparatus for efficiently transferring automobiles and the like to and from places of storage.

My U.S. Patents 3,042,228 and 3,125,235 disclose a parking system and parking mechanism adapted for use in automatic parking garages. The system involves a building structure having one or more horizontal passageways with storage chambers disposed above and open to each passageway to receive automobiles and the like which are carried to and from selected storage chambers by a dolly. The vehicle is lifted in and out of the storage chamber by a lifting mechanism operatively mounted to the dolly. The above system is particularly useful for congested urban areas where real estate values are high, available property is limited but where buildings may be erected to substantial heights.

The present invention has for one of its objects improvements in storage systems particularly as applied to automatic and semi-automatic parking garages.

Another object of this invention is to provide a storage system which maximizes the amount of space available for storage purposes within a given volume and minimizes the amount of access or passageway space.

Still another object of this invention is to provide a parking system and associated apparatus which in one embodiment is adapted to store a vehicle above and below a passageway and in another embodiment also to either side of the passageway.

More particularly, this invention features a parking system comprising in combination a building structure having one or more horizontally extending passageways with parking stalls located above and below the passageway. A dolly having an open center portion is adapted to ride along the passageway with a platen and vehicle carried thereon. The dolly is provided with lifting and lowering mechanisms for raising the vehicle and platen into a parking stall located above the passage or lower the platen and vehicle into a parking stall disposed below the passage. Locking mechanism is provided to hold the platen and vehicle in the upper parking stall. This invention also features a novel apparatus for carrying vehicles to and from parking stalls and for lifting the vehicles selectively upwardly or downwardly into a parking stall which may be located above or below the dolly.

In a modification of this invention there is featured a parking system and associated apparatus involving a building structure in combination with a dolly wherein vehicles may be parked in stalls located above, below and to either side of a passageway extending horizontally through the building. A self-powered dolly is employed to carry vehicles along the passageway and to selectively transfer a vehicle on a platen from the dolly into a selected parking stall.

Figure 2:
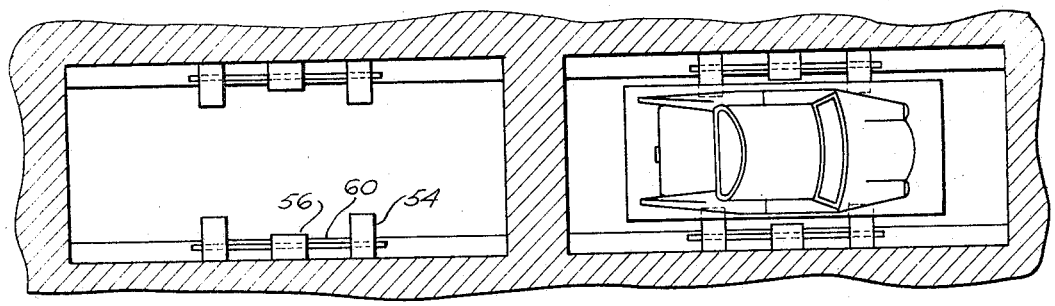
Figure 3:
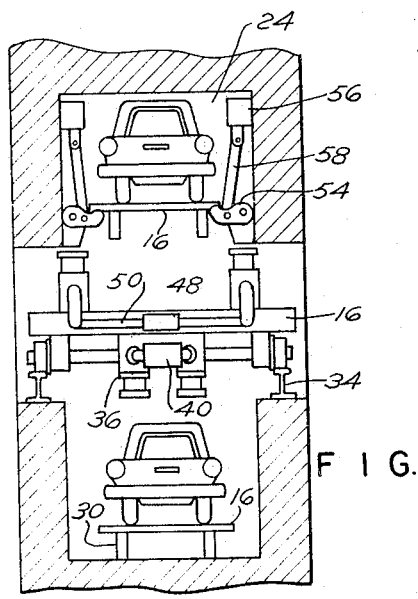
Figure 4:
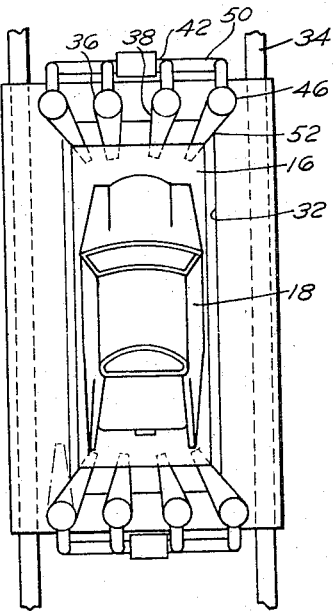
Figure 11:
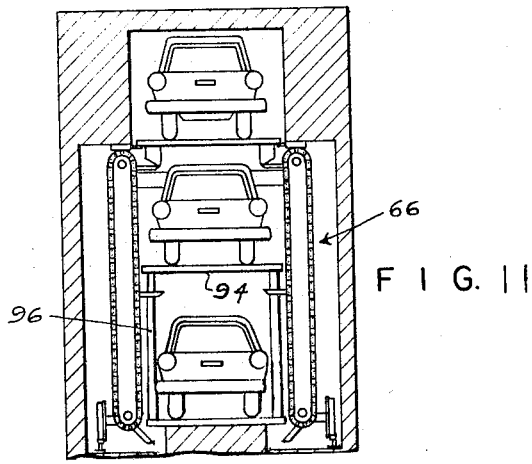
Figure 5:
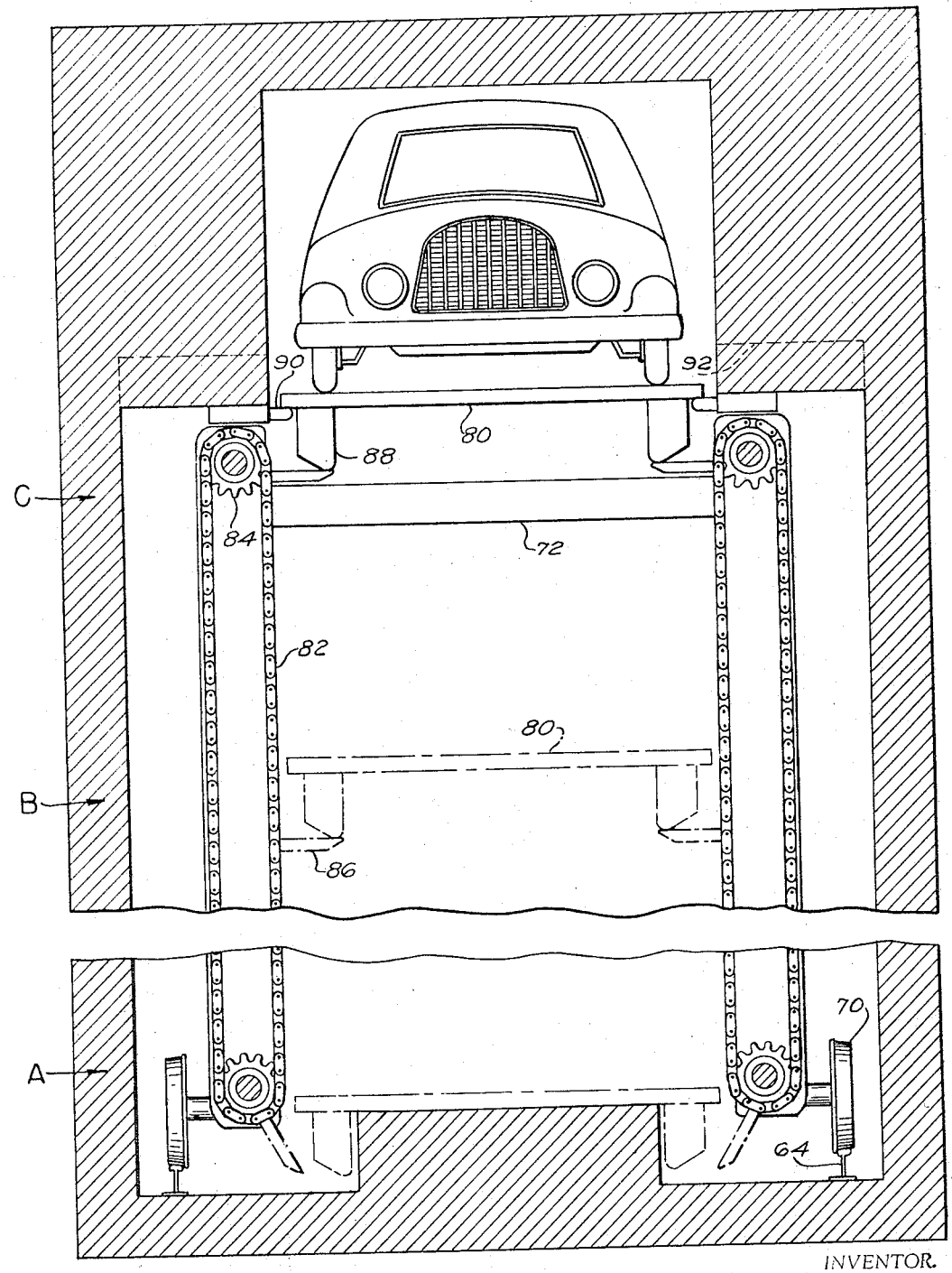
Figure 6:
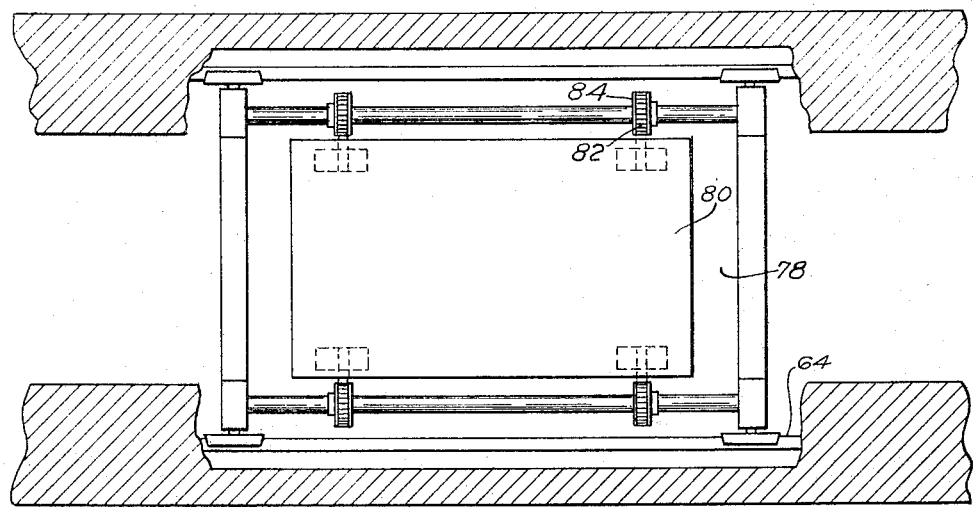
Figure 7:
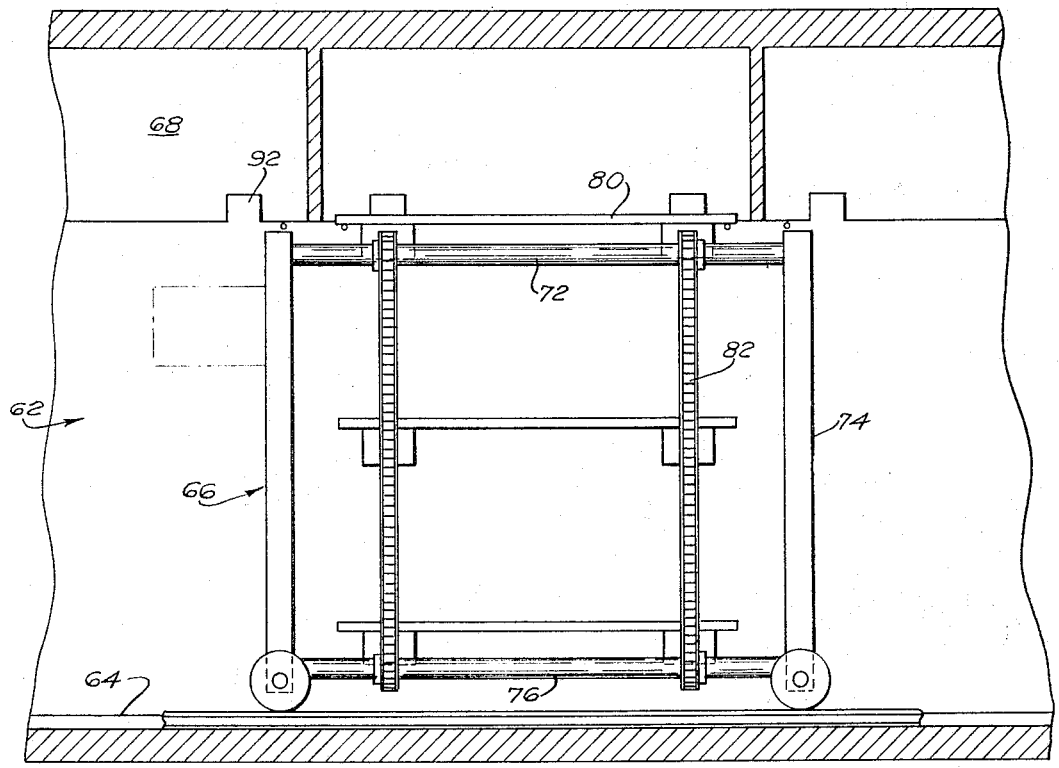
Figure 8:
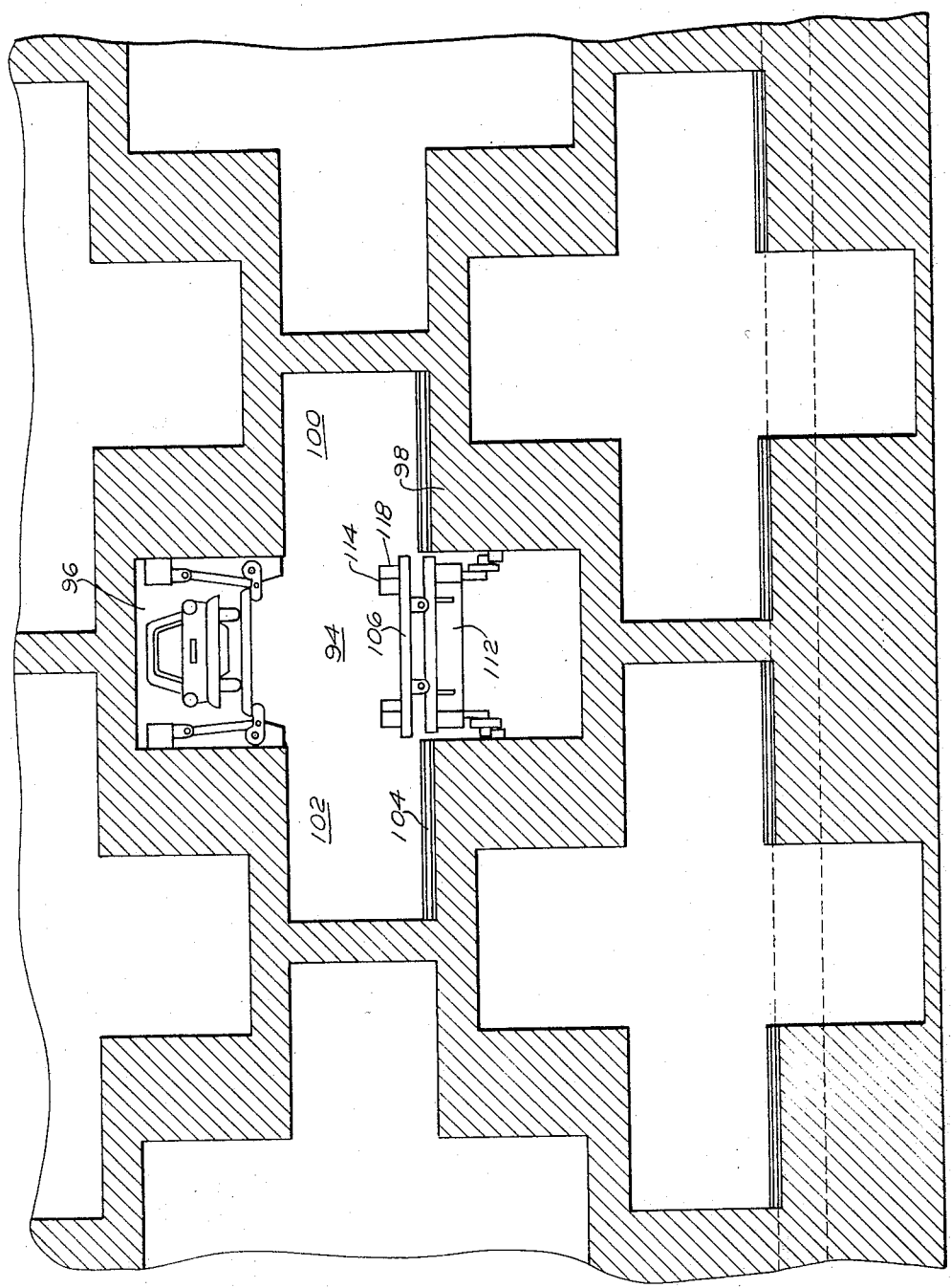
Figure 9:
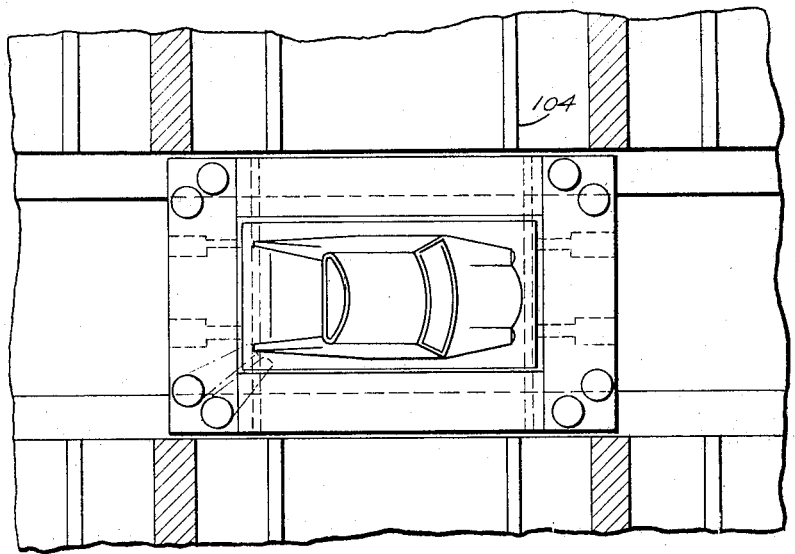
Figure 10:
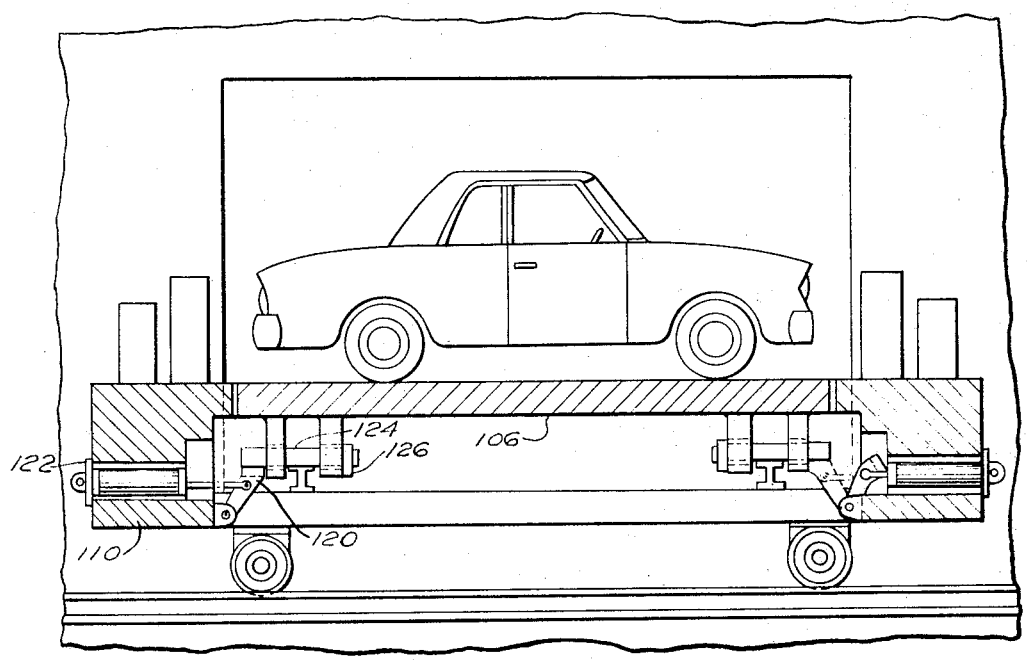

However, these and other features of the invention, along with further objects and advantages thereof, will become more fully apparent from the following detailed description of preferred embodiments of the invention, with reference being made to the accompanying drawings, in which:

FIG. 1 is a sectional view in side elevation of a parking garage made according to the invention and showing the parking system generally, FIG. 2 is a top plan view partly in section of a pair of upper parking stalls, FIG. 3 is a view in front elevation partly in section showing a passageway with upper and lower parking stalls and the movable dolly, FIG. 4 is a top plan view of the movable dolly carrying a platen and vehicle thereon, FIG. 5 is a view in front elevation partly in section showing a modification of the invention, FIG. 6 is a top plan view of the FIG. 5 modification, FIG. 7 is a view in side elevation partly in section of the FIG. 5 modification, FIG. 8 is a view in front elevation partly in section showing a modified parking system embodying features of this invention, FIG. 9 is a top plan view partly in section showing details of the FIG. 8 embodiment, FIG. 10 is a view in side elevation partly in section showing the dolly employed in the FIG. 8 embodiment, and, FIG. 11 is a view in front elevation, partly in section, showing another modification of the invention.

Referring now to the drawings and to FIGS. 1 through 4 in particular, the reference character 10 generally indicates a multi-story building structure having an elevator 12 adapted to carry a movable dolly 14 along with its loads of a platen 16 and car 18 to a selected horizontal passageway 20 located on each floor of the building. The building is provided with an access opening 22 on the ground floor through which automobiles 18 are driven directly onto a dolly 14 which is furnished with a platen 16.

Formed above and below each of the passageways 20 and in communication therewith are parking stalls 24 and 26 to accommodate a platen 16 and vehicle 18. It will be understood that when a vehicle is driven into the garage for storage it will drive directly onto the dolly standing ready on the elevator at the ground floor. The elevator will then lift the dolly, platen and vehicle to a selected floor level where it will stop in line with the passageway for the particular level. The dolly will then move off the elevator along the selected passageway 20 until it comes into register with a vacant parking stall whether it be an upper stall 24 or a lower stall 26. The dolly will then stop and either lift the platen and vehicle into an upper stall or lower the platen and vehicle into a lower stall, as desired. Locking mechanism 28 is provided in each upper stall to hold the platen in position when it is lifted therein. For lower stalls 26 the platen and its load merely rest on the floor of the stall as suggested in FIG. 1.

The platen 16 is of flat rectangular construction having a pair of depending runners 30 which support the flat upper portion of the platen raised above the floor level when the platen is deposited in a lower parking stall 26.

The dolly 14 is also of rectangular construction but is formed with a center opening 32 of rectangular shape and of a size slightly larger than the platen 16 to permit the platen and its load to be passed vertically therethrough. The dolly is preferably self-propelled as by an electric motor energized through batteries or a trolley system (not shown) and rides on rails 34 extending along either side of the passageway 20. The elevator 12 is also provided with rails which line up with the passageway rails when the elevator stops at a particular level to pick up or discharge a dolly.

The lifting and lowering mechanism which is integrated with the dolly 16 comprises sets of hydraulic lifts mounted generally near the corners of the dolly. At each end, there is a pair of inner telescopic hydraulic lifts 36 generally disposed on the underside of the dolly and adapted for use in lowering the platen into a lower stall and raise it for removal when necessary. These lifts are provided with horizontally extending arms 38 which are adapted to engage the underside of the platen 16 when raising, lowering or carrying the platen. The arms 38 are rotatable about a vertical axis so that the ends may be moved into and out of engagement with the platen as when the platen is being stored in a lower stall. The mechanism for rotating the arms includes a cylinder 40 having a piston rod 42 extending from each end and pivotally engaging a crank 44 which is rotatably connected about the hydraulic lift 36 and drivingly connected into the lifting arm 38. It will be understood that reciprocation of the piston rods will casue the arms to rotate about their vertical axes and to move respectively into or out of engagement with the platen.

The mechanism for raising the platen into an upper stall is similar to the lowering mechanism and includes a pair of outer telescopic hydraulic lifts 46 generally located on the upper surface of the platen and on either end thereof. These lifts are also provided with arms for engaging the platen, as best shown in FIG. 4. It will be noted that the outer hydraulic lifts 46 are disposed more or less to the side of the dolly to permit the vehicle 18 to drive on and off the dolly when the dolly is being initially loaded or unloaded at the entrance or exit of the garage. The raising mechanism is also provided with a cylinder and piston rods 48 and 50 which are employed to rotate platen engaging arms 52 into and out of engagement with the platen. It will be understood that when the platen is to be lowered down through the dolly opening 32, it will be necessary to rotate the arms 52 out of the way, as suggested in dotted outline in FIG. 4, to permit the platen to be lowered. When the platen is to be raised the arms are pivoted back into operating position and the platen is raised by the telescoping hydraulic lifts 46.

The platen 16, when raised into an upper stall, is locked therein by means of latches 54 pivotally mounted on opposite side walls of the parking stall, each pair adapted to be pivoted into and out of operating position by means of a hydraulic cylinder 56 drivingly connected with the latches 54 by means of a rod 58. As best shown in FIGS. 1, 2 and 3, the rod 58 connects with a shaft 60 which engages a pair of latches at their outer portions and by actuation of the cylinders 56 the rods 58 will bias the latches up and out of the way to permit the platen and vehicle to be raised fully into the parking stall and then to bais them outwardly into a platen engaging position so that the platen may be dropped slightly and come to rest on the latches as shown in FIG. 3. It will be understood that when the platen and vehicle are to be removed from the parking stall the dolly will move underneath the stall and the lifting mechanism will telescope upwardly and raise the platen sufficiently to permit the latches to be retracted out of the way. This will then permit the platen to be lowered down into a conveying position where it may be carried along the passageway to the elevator and thence out of the garage.

Referring now more particularly to FIGS. 5, 6 and 7 there is illustrated a modification of the invention and in this embodiment the individual lower parking stalls have been eliminated from the building structure and replaced by a relatively high continuous passageway 62 having rails 64 extending along the bottom thereof for a dolly 66 to ride therealong. As before, the building structure includes a series of parking stalls 68 disposed above the passageway 62 and in open communication therewith.

The dolly 68, in this embodiment, is a self-propelled vehicle having wheels 70 which ride on the rails 64 and has a raised chassis 72 which extends near the top portion of the passageway. The chassis is supported by elongated upright members 74 held together at the bottom portions by longitudinal cross pieces 76 to define thereby a vehicle having a central vertical opening 78 of a size sufficient to pass a platen 80 vertically therethrough. As best shown in FIG. 5, the lower portion of the dolly has a center portion which is open from front to rear whereby the dolly may ride along the passageway on the rails spanning any vehicle which may be parked along the floor of the passageway.

The dolly is provided with power operated lifting mechanism comprising a pair of synchronously operated chain lifts 82 on each side of the dolly. The chain lift is driven by sprocket gears 84 and is provided with inwardly extending arms 86 adapted to engage legs 88 depending from the platen 80.

In operation, the dolly 66 will pick up a platen 80 onto which a vehicle will drive at the garage entrance. This loading position is indicated by position A in FIGS. 5 and 7. Once the vehicle is on board the platen, the chain lift 82 will be actuated to raise the platen and vehicle to a travelling position indicated at B in FIGS. 5 and 7. This position is mid-way between the lowermost and uppermost extent of the lifting mechanism and is sufficiently high so that the dolly may travel along the passageway with clearance over vehicles stored along the passageway. Also, the position B is low enough that the top of the vehicle does not extend above the top of the dolly. Once the dolly comes into register with a parking space, whether it is in a stall above the dolly or in the open passageway, the dolly will come to a halt. Thereupon, if the platen is to be stored along the passageway, the chain lift 82 will lower the platen back to position A and deposit the platen on the raised center portion of the passageway floor. As best shown in FIG. 5 there is sufficient clearance at the lower portion of the dolly for the arms 86 to swing around clear after the platen is deposited. If the platen is to be raised into an upper parking stall 68 the chain lift mechanism is actuated to raise it to position C in FIG. 5. This will move the platen up into the parking stall and while it is in this position retractable lugs 90 extend from either side and at each end of the parking stall to engage the under edge of either side of the platen, as best shown in FIG. 5, to hold the platen in a storing position. Clearance 92 is provided on either side of the parking stall to accommodate the arms 86 as they swing over the top of the sprocket gears 84. It will be understood that when the platen is to be lowered, the arms 86 are moved up to engage the legs 88 lifting the platen sufficiently to permit the lugs 90 to be retracted. The platen is then lowered to a travelling position B and carried along the passageway to the elevator and thence out of the garage.

Referring now to FIGS. 8, 9 and 10 there is illustrated another modification of the invention and in this embodiment platens with their vehicles may be stored not only above or below a common passageway but also to either side thereof. As best shown in FIG. 8, a parking garage is formed with a plurality of horizontal passageways 94 which communicate with parking stalls 96, 98, 101 and 102 located respectively above, below and to either side of the passageway 94. In cross-section the construction is more or less cruciform and in practice the passageways are staggered in the manner shown in FIG. 8 to optimize the available space in the building. As shown an upper parking stall extends structurally between the lower parking stalls of two adjacent passageways on the next upper level. Each upper parking stall is provided with latching mechanisms similar to those in the first embodiment and the lower parking stall is provided with the flat floor on which the platen may rest. The parking stalls 100 and 102 on either side of the passageway are provided with horizontally extending rails 104 on which a platen 106 will ride and rest as will appear more fully below. Rails 108 are also mounted along the passageway 94 to support a dolly 110 which rides therealong.

The dolly 110 employed in this embodiment is a self-propelled vehicle having a vertical opening 112 formed centrally therein through which a platen 106 may be lowered by telescopic hydraulic lifting mechanism 114 located at either end of the dolly. This lifting mechanism is similar to that described in the principle embodiment and includes arms 116 which engage the under marginal edge of the platen 106. Telescopic hydraulic lift mechanism 118 is also provided for raising the platen into an upper parking stall. As before, the lifting mechanism is located at each corner of the dolly to permit the vehicle to be driven onto the platen and also positioned so as to permit the platen and its vehicle to be shifted to either side of the dolly into a side parking stall.

The mechanism for laterally transferring the platen and its load from the dolly into a side parking stall includes a retractable rail 120 at each end of the dolly opening 112 actuated by a hydraulic cylinder 122 and shown in an extended position on the left-hand side of FIG. 10 and in a retracted position on the right-hand side thereof. When extended the rail 120 is employed to support rollers 124 which are mounted on the underside of the platen 106. It will be understood that when a platen and car are to be stored in a side parking stall the dolly will come alongside the stall so that the rails 104 line up precisely with the rollers 124. At this point, the platen will be supported by the retractable rails 120 which will be in an extended position. When the system is lined up, the platen 106 is transferred from the dolly into a parking stall and the load will be transferred from the retractable rails 120 onto the fixed rails 104 within the parking stalls. Various devices may be employed to shift the platen 106 from the rails 120 into the parking stalls. For example, the rollers 124 may be power driven by relatively small electric motors 126, for example.

It will be understood that when a platen and vehicle are to be passed down through the dolly opening as when storing or retrieving a platen and vehicle from a lower parking stall, the rails 120 will be retracted into the dolly so as to provide clearance for the platen to pass down through the opening. The system and the mechanism thus make possible a storage arrangement in which a single passageway will service parking stalls located to either side of the passageway and above and below the passageway. This arrangement optimizes the available parking volume insofar as the passageway space required is kept to an absolute minimum.

In FIG. 11 there is illustrated another modification of the invention and in this embodiment means are provided for storing vehicles and the like along the passageway 62 when employing the dolly 66 shown in FIGS. 6, 7 and 8. Assuming all the upper parking stalls and the floor of the passageway are filled with cars, additional cars may be parked along the passageway by the use of portable raised platforms 94. These platforms are similar to the platens but provided with extended legs 96 which span the car on the passageway floor and rest on top of the bottom platen. The platform may thus be picked up together with its car and carried along to a selected part of the passageway and deposited. Thus, the entire volume of the structure may be utilized for storage. Thus, the entire volume of the structure may be utilized for storage. This latter arrangement would be particularly useful for mobile parking systems of the sort used in shipping autos by train or boat.

The system described herein may be readily installed in an existing structure or may be an entirely new structure. Also, the system lends itself to pre-fabrication whereby installations which are flexible in size and design may be conveniently assembled either permanently or temporarily at a selected site. The system may be operated either manually, semi-automatically or on a fully automatic basis as desired. Obviously, various power means such as hydraulic, pneumatic or electric or combinations thereof may be used to operate the system.

While the invention has been described with particular reference to the illustrated embodiments, it will be understood that numerous modifications thereto will appear to those skilled in the art. Also, it will be understood that the above description and accompanying drawings should be taken as illustrative of the invention and not in a limiting sense.

Having thus described the invention, what I claim and desire to obtain by Letters Patent of the United States is:

1. A parking system for motor vehicles and the like, comprising in combination, a building structure embodying a plurality of floors disposed in vertically spaced relation and including a pair of spaced parallel tracks along each floor with clearance space thereabove for passage of a load and storage spaces above and below the clearance space and open thereto, an elevator disposed for vertical movement to said tracks, a load carrying dolly adapted to be carried on the elevator and provided with wheels for movement along the tracks, means for selectively lifting a load from the dolly into a storage space above said clearance space or lowering a load from the dolly into a storage space above said clearance space or lowering a load from the dolly into a storage space below said clearance space and means for retaining a load in the storage spaces independently of the lifting and lowering means.

2. A parking system according to claim 1 wherein said dolly is formed with a central opening vertically therethrough for lowering a load onto a storage space below said clearance space.

3. A parking system for motor vehicles and the like, comprising in combination, a building structure embodying a plurality of floors disposed in vertically spaced relation and including a pair of spaced parallel tracks along each floor with clearance space thereabove for passage of a load and storage space above below and to both sides of the clearance space and open thereto, an elevator disposed for vertical movement to said tracks, a load carrying dolly adapted to be carried on the elevator and provided with wheels for movement along the tracks, means for selectively lifting a load from the dolly into the storage space above said clearance space, lowering a load from the dolly into the storage space below said clearance space or laterally transferring a load from the dolly into a storage space to the side of said clearance space and means for retaining a load in the storage spaces independently of the lifting and lowering means.

4. A parking system according to claim 3 including spaced parallel tracks in each storage space to the side of said clearance space to receive said load and spaced parallel tracks mounted on said dolly for alignment with tracks in the side storage spaces.

5. A parking system for motor vehicles and the like, comprising in combination, a building structure embodying a plurality of floors disposed in vertically spaced relation and including a road bed along each floor with clearance space thereabove for passage of a load and storage space above the clearance space and open thereto and along said road bed, an elevator disposed for vertical movement to the road beds, a load carrying dolly adapted to be carried on the elevator, said dolly being formed with a longitudinal clearance and provided with wheels for movement along the road beds, means for selectively lifting a load from the dolly into a storage space above said clearance space or lowering a load from the dolly for storage along said road bed and means for retaining a load in the storage space independently of the lifting and lowering means.

References Cited by the Examiner

UNITED STATES PATENTS

| | | | |
|---|---|---|---|
| 2,576,345 | 11/1951 | Jacob | 214—392 |
| 2,598,750 | 6/1952 | Bargehr | 214—16.1 |
| 3,035,715 | 5/1962 | Stone | 214—16.1 |
| 3,042,228 | 7/1962 | Frangos | 214—16.1 |

GERALD M. FORLENZA, *Primary Examiner.*

R. B. JOHNSON, *Assistant Examiner.*